United States Patent [19]

Patterson

[11] Patent Number: 5,464,562
[45] Date of Patent: Nov. 7, 1995

[54] POLYOXYALKYLENE POLYETHER MONOOL POLYURETHANE FOAM ADDITIVE

[75] Inventor: Jimmy L. Patterson, New Boston, Mich.

[73] Assignee: BASF Corporation, Mt. Olive, N.J.

[21] Appl. No.: 427,016

[22] Filed: Apr. 24, 1995

[51] Int. Cl.⁶ .................................................. C08K 3/00
[52] U.S. Cl. ........................ 252/182.28; 252/182.23; 521/116; 521/131; 521/172
[58] Field of Search .............................. 521/116, 131, 521/172; 252/182.28, 182.23

[56] References Cited

U.S. PATENT DOCUMENTS

| | | |
|---|---|---|
| 2,425,755 | 8/1947 | Roberts et al. . |
| 3,340,309 | 9/1967 | Weipert . |
| 3,890,254 | 6/1975 | Guthrie . |
| 4,557,853 | 12/1985 | Collins . |
| 4,892,673 | 1/1990 | Dixit et al. . |
| 5,176,713 | 1/1993 | Dixit et al. . |

OTHER PUBLICATIONS

Polyurethanes World Congress 1993, Oct. 10–13, pp. 33–39, "Hydrocarbons Provide Zero ODP and Zero GWP Ensulation for Household Refrigeration".

*Primary Examiner*—Morton Foelak
*Attorney, Agent, or Firm*—Dennis V. Carmen

[57] ABSTRACT

There is now provided a polyol composition containing a polyol having polyester linkages, an aliphatic or cycloaliphatic $C_4$-$C_7$ hydrocarbon blowing agent, and a polyoxyalkylene polyether monool initiated with a $C_8$-$C_{24}$ fatty hydrocarbon having one alkylene oxide active hydrogen atom. We have found that the monool emulsifies the $C_4$-$C_7$ blowing agent in the compound having polyester linkages, to form an emulsified polyol composition, after which an organic aromatic isocyanate may be reacted with the emulsified polyol composition to form a closed cell polyurethane foam.

The polyol composition is used to make rigid closed cell polyisocyanate based foams which are dimensionally stable, and have good insulation values and flame retardance. Combining the monool with the polyester based polyol produces a foam having a density lower than that of a reference foam made with the same ingredients and amounts except in the absence of the monool. Whether the monool is merely mixed with the polyol or used to form an emulsion with the hydrocarbon blowing agent and the polyol, the foam density may be lowered when the monool is used.

26 Claims, No Drawings

POLYOXYALKYLENE POLYETHER MONOOL POLYURETHANE FOAM ADDITIVE

FIELD OF THE INVENTION

The present invention relates to rigid closed cell polyisocyanate based foams and to polyol compositions used to make such foams. In particular, the invention relates to polyisocyanate based foams and polyol compositions used to make the foams, containing a polyol having polyester linkages, a polyoxyalkylene polyether monool, and a $C_4$-$C_7$ hydrocarbon blowing agent.

BACKGROUND OF THE INVENTION

Hydrocarbon blowing agents such as pentane and cyclopentane are considered viable alternatives to the traditional CFC's in the rigid foam insulation sector. A publication by H. Ballhaus et al. entitled "Hydrocarbons Provide Zero ODP and Zero GWP Insulation for Household Refrigeration," in Polyurethanes World Congress 1993, Oct. 10–13, 1993, pages 33–39, describes a foaming apparatus adapted for use with the volatile hydrocarbon blowing agents. As can be seen from the description in this publication, the hydrocarbon is separately metered into the mix head, or fed into a day tank which is kept under constant agitation. Many of the insulation foams use polyester polyols as the base polyol. The hydrocarbons have only a limited or no solubility in most polyester polyols. To avoid phase separation, the hydrocarbon blowing agent must either be metered into a high pressure mix head, or fed into the day tank under agitation to keep the hydrocarbon mixed with the polyol.

Therefore, we found it desirable to find a chemical agent which would keep hydrocarbon blowing agents dispersed throughout the polyol in the absence of agitation, either in the form of an emulsion, a suspension, or homogeneously solubilized. The chemical agent chosen, however, should not sacrifice the mechanical properties of an equivalent foam made in the absence of the chemical agent, in particular, the k-factor, the flammability, the compressive strength, and the dimensional stability of the foam.

SUMMARY OF THE INVENTION

There is now provided a polyol composition containing a polyol having polyester linkages, an aliphatic or cycloaliphatic $C_4$-$C_7$ hydrocarbon blowing agent, and a polyoxyalkylene polyether monool initiated with a $C_8$-$C_{24}$ fatty hydrocarbon having one alkylene oxide active hydrogen atom. We have found that the $C_4$-$C_7$ blowing agent is emulsified with the compound having polyester linkages by mixing with the monool to form an emulsified polyol composition, after which the organic aromatic isocyanate is reacted with the emulsified polyol composition.

The polyol composition is used to make rigid closed cell polyisocyanate based foams which are dimensionally stable, and have good insulation values and flame retardance. An unexpected advantage of mixing the monool with the polyols, however, was that the density of the resulting foam was lower than reference foams made with the same ingredients and mounts except in the absence of the monool. In one embodiment, the density of the foam made with the monool was at least 2.00% less than reference foams made with the same ingredients and amounts except in the absence of the monool. Further, it is not necessary to emulsify the blowing agent in the polyol first to experience this advantage. Thus, one has the option of using the monool to both emulsify the hydrocarbon blowing agent in the polyol and lower the density of the foam, or merely mix the monool with the polyol and separately meter the hydrocarbon blowing agent into the mix head and thereby also lower the density of the resulting foam.

There is also provided a method for making a rigid closed cell polyisocyanate based foam and the foam thereof, by reacting an organic aromatic polyisocyanate and a polyol composition in the presence of a $C_4$-$C_7$ aliphatic or cycloaliphatic hydrocarbon blowing agent, where the polyol composition comprises a compound having polyester linkages, and a polyoxyalkylene polyether monool initiated with a $C_8$-$C_{24}$ fatty hydrocarbon having one alkylene oxide active hydrogen atom. The hydrocarbon blowing agent may be emulsified with the polyol by using the monool, or the polyisocyanate may be reacted with the polyol composition in the presence of the hydrocarbon blowing agent without first forming an emulsion.

DETAILED DESCRIPTION OF THE INVENTION

As the first ingredient in the polyol composition, there is provided an a) polyol having polyester linkages. Preferably, The polyols have a functionality of 1.8 to 8, preferably 3 to 8, and an average hydroxyl number of 150 to 850, more preferably 350 to 800. Polyols having hydroxyl numbers outside this range may be used, but it is preferred that the average hydroxyl number for the total amount of polyols used fall within the range of 150 to 850.

Other types of polyols may be used in combination with the polyol having polyester linkages. Examples of polyols are thioether polyols, polyester amides and polyacetals containing hydroxyl groups, aliphatic polycarbonates containing hydroxyl groups, amine terminated polyoxyalkylene polyethers, and preferably, polyester polyols, polyester polyether polyols, polyoxyalkylene polyether polyols, and graft dispersion polyols. Mixtures of at least two of the aforesaid polyols can be used as long as the combination has an average hydroxyl number in the aforesaid range.

The terms "polyol having polyester linkages" and "polyester polyol" as used in this specification and claims includes any minor amounts of unreacted polyol remaining after the preparation of the polyester polyol and/or unesterified low molecular weight polyols (e.g., glycol) added after the preparation of the polyester polyol. The polyester polyol can include up to about 40 weight percent free glycol.

Polyols having polyester linkages broadly include any polyol having two or more ester linkages in the compound, such as the conventional polyester polyols and the polyester-polyether polyols.

The polyester polyols advantageously have an average functionality of about 1.8 to 8, preferably about 1.8 to 5, and more preferably about 2 to 3. Their average hydroxyl number values generally fall within a range of about 15 to 750, preferably about 30 to 550, and more preferably about 150 to 500 (taking into account the free glycols that may be present), and their free glycol content generally is from about 0 to 40 weight percent, and usually from 2 to 15 weight percent, of the total polyester polyol component.

Suitable polyester polyols can be produced, for example, from organic dicarboxylic acids with 2 to 12 carbons, preferably aliphatic dicarboxylic acids with 4 to 6 carbons, and multivalent alcohols, preferably diols, with 2 to 12 carbons, preferably 2 to 6 carbons. Examples of dicarboxylic acids include succinic acid, glutaric acid, adipic acid, suberic acid, azelaic acid, sebacic acid, decanedicarboxylic acid, maleic acid, fumaric acid, phthalic acid, isophthalic acid, and terephthalic acid. The dicarboxylic acids can be used individually or in mixtures. Instead of the free dicarboxylic acids, the corresponding dicarboxylic acid derivatives may also be used such as dicarboxylic acid mono- or di-esters of alcohols with 1 to 4 carbons, or dicarboxylic acid anhydrides. Dicarboxylic acid mixtures of succinic acid, glutaric acid and adipic acid in quantity ratios of 20–35:35–50:20–32 parts by weight are preferred, especially adipic acid. Examples of divalent and multivalent alcohols, especially diols, include ethanediol, diethylene glycol, 1,2- and 1,3-propanediol, dipropylene glycol, 1,4-butanediol, 1,5-pentanediol, 1,6-hexanediol, 1,10-decanediol, glycerine and trimethylolpropanes, tripropylene glycol, tetraethylene glycol, tetrapropylene glycol, tetramethylene glycol, 1,4-cyclohexane-dimethanol, ethanediol, diethylene glycol, 1,4-butanediol, 1,5-pentanediol, 1,6-hexanediol, or mixtures of at least two of these diols are preferred, especially mixtures of 1,4-butanediol, 1,5-pentanediol, and 1,6-hexanediol. Furthermore, polyester polyols of lactones, e.g., ε-caprolactone or hydroxycarboxylic acids, e.g., ω-hydroxycaproic acid, may also be used.

The polyester polyols can be produced by polycondensation of organic polycarboxylic acids, e.g., aromatic or preferably aliphatic polycarboxylic acids and/or derivatives thereof and multivalent alcohols in the absence of catalysts or preferably in the presence of esterification catalysts, preferably in an atmosphere of inert gases, e.g., nitrogen, carbon dioxide, helium, argon, etc., in the melt at temperatures of 150° to 250° C., preferably 180° to 220° C., optionally under reduced pressure, up to the desired acid value which is preferably less than 10, especially less than 2. In a preferred embodiment, the esterification mixture is subjected to polycondensation at the temperatures mentioned above up to an acid value of 80 to 30, preferably 40 to 30, under normal pressure, and then under a pressure of less than 500 mbar, preferably 50 to 150 mbar. The reaction can be carried out as a batch process or continuously. When present, excess glycol can be distilled from the reaction mixture during and/or after the reaction, such as in the preparation of low free glycol-containing polyester polyols usable in the present invention. Examples of suitable esterification catalysts include iron, cadmium, cobalt, lead, zinc, antimony, magnesium, titanium and tin catalysts in the form of metals, metal oxides or metal salts. However, the polycondensation may also be preformed in liquid phase in the presence of diluents and/or chlorobenzene for azeotropic distillation of the water of condensation.

To produce the polyester polyols, the organic polycarboxylic acids and/or derivatives thereof and multivalent alcohols are preferably polycondensed in a mole ratio of 1:1–1.8, more preferably 1:1.05–1.2.

After transesterification or esterification, the reaction product can be reacted with an alkylene oxide to form a polyester polyol mixture. This reaction desirably is catalyzed. The temperature of this process should be from about 80° to 170° C., and the pressure should generally range from about 1 to 40 atmospheres.

While the aromatic polyester polyols can be prepared from substantially pure reactant materials, more complex ingredients are advantageously used, such as the side stream, waste or scrap residues from the manufacture of phthalic acid, terephthalic acid, dimethyl terephthalate, polyethylene terephthalate, and the like. Particularly suitable compositions containing phthalic acid residues for use in the invention are (a) ester-containing byproducts from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid, (h) trimellitic anhydride, and (i) combinations thereof. These compositions may be converted by reaction with the polyols of the invention to polyester polyols through conventional transesterification or esterification procedures.

Polyester polyols whose acid component advantageously comprises at least about 30 percent by weight of phthalic acid residues are useful. By phthalic acid residue is meant the group:

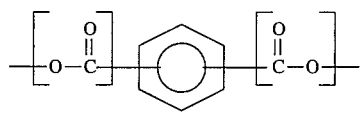

A preferred polycarboxylic acid component for use in the preparation of the aromatic polyester polyols is phthalic anhydride. This component can be replaced by phthalic acid or a phthalic anhydride bottoms composition, a phthalic anhydride crude composition, or a phthalic anhydride light ends composition, as such compositions are defined in U.S. Pat. No. 4,529,744.

Other preferred materials containing phthalic acid residues are polyalkylene terephthalates, especially polyethylene terephthalate (PET), residues or scraps.

Still other preferred residues are DMT process residues, which are waste or scrap residues from the manufacture of dimethyl terephthalate (DMT). The term "DMT process residue" refers to the purged residue which is obtained during the manufacture of DMT in which p-xylene is convened through oxidation and esterification with methanol to the desired product in a reaction mixture along with a complex mixture of byproducts. The desired DMT and the volatile methyl p-toluate byproduct are removed from the reaction mixture by distillation leaving a residue. The DMT and methyl p-toluate are separated, the DMT is recovered and methyl p-toluate is recycled for oxidation. The residue which remains can be directly purged from the process or a portion of the residue can be recycled for oxidation and the remainder diverted from the process or, if desired, the residue can be processed further as, for example, by distillation, heat treatment and/or methanolysis to recover useful constituents which might otherwise be lost, prior to purging the residue from the process. The residue which is finally purged from the process, either with or without additional processing, is herein called DMT process residue.

These DMT process residues may contain DMT, substituted benzenes, polycarbomethoxy diphenyls, benzyl esters of the toluate family, dicarbomethoxy fluorenone, carbomethoxy benzocoumarins and carbomethoxy polyphenols. Cape Industries, Inc. sells DMT process residues under the trademark Terate® 101. DMT process residues having a different composition but still containing the aromatic esters and acids are also sold by DuPont and others. The DMT process residues to be transesterified in accordance with the present invention preferably have a functionality at least slightly greater than 2. Such suitable residues include those disclosed in U.S. Pat. Nos. 3,647,759; 4,411,949; 4,714,717; and 4,897,429; the disclosures of which with respect to the residues are hereby incorporated by reference.

Examples of suitable polyester polyols are those derived from PET scrap and available under the designation Chardol 170, 336A, 560, 570, 571 and 572 from Chardonol and Freol 30-2150 from Freeman Chemical. Examples of suitable DMT derived polyester polyols are Terate® 202, 203, 204, 254, 2541, and 254A polyols, which are available from Cape Industries. Phthalic anhydride derived polyester polyols are commercially available under the designation Pluracol® polyol 9118 from BASF Corporation, and Stepanol PS-2002, PS-2402, PS-2502A, PS-2502, PS-2522, PS-2852, PS-2852E, PS-2552, and PS-3152 from Stepan Company.

Polyoxyalkylene polyether polyols, which can be obtained by known methods, can be mixed with the polyol having polyester linkages. For example, polyether polyols can be produced by anionic polymerization with alkali hydroxides such as sodium hydroxide or potassium hydroxide or alkali alcoholates, such as sodium methylate, sodium ethylate, or potassium ethylate or potassium isopropylate as catalysts and with the addition of at least one initiator molecule containing 2 to 8, preferably 3 to 8, reactive hydrogens or by cationic polymerization with Lewis acids such as antimony pentachloride, boron trifluoride etherate, etc., or bleaching earth as catalysts from one or more alkylene oxides with 2 to 4 carbons in the alkylene radical. Any suitable alkylene oxide may be used such as 1,3-propylene oxide, 1,2- and 2,3-butylene oxide, amylene oxides, styrene oxide, and preferably ethylene oxide and 1,2-propylene oxide and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups.

Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends or sequential addition of two or more alkylene oxides. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459.

Polyethers which are preferred include the alkylene oxide addition products of polyhydric alcohols such as ethylene glycol, propylene glycol, dipropylene glycol, trimethylene glycol, 1,2-butanediol, 1,5-pentanediol, 1,6-hexanediol, 1,7-heptanediol, hydroquinone, resorcinol glycerol, glycerine, 1,1,1-trimethylol-propane, 1,1,1-trimethylolethane, pentaerythritol, 1,2,6-hexanetriol, α-methyl glucoside, sucrose, and sorbitol. Also included within the term "polyhydric alcohol" are compounds derived from phenol such as 2,2-bis(4-hydroxyphenyl)-propane, commonly known as Bisphenol A.

Suitable organic amine starting materials include aliphatic and cycloaliphatic amines and mixtures thereof, having at least one primary amino group, preferably two or more primary amino groups, and most preferable are the diamines. Specific non-limiting examples of aliphatic amines include monoamines having 1 to 12, preferably 1 to 6 carbon atoms, such as methylamine, ethylamine, butylamine, hexylamine, octylamine, decylamine and dodecylamine; aliphatic diamines such as 1,2-diaminoethane, propylene diamine, 1,4-diaminobutane, 1,6-diaminohexane, 2,2-dimethyl-,3-propanediamine, 2-methyl-1,5-pentadiamine, 2,5-dimethyl-2,5-hexanediamine, and 4-aminomethyloctane-1,8-diamine, and amino acid-based polyamines such as lysine methyl ester, lysine aminoethyl ester and cystine dimethyl ester; cycloaliphatic monoamines of 5 to 12, preferably of 5 to 8, carbon atoms in the cycloalkyl radical, such as cyclohexylamine and cyclo-octylamine and preferably cycloaliphatic diamines of 6 to 13 carbon atoms, such as cyclohexylenediamine, 4,4'-, 4,2'-, and 2,2'-diaminocyclohexylmethane and mixtures thereof; aromatic monoamines of 6 to 18 carbon atoms, such as aniline, benzylamine, toluidine and naphthylamine and preferably aromatic diamines of 6 to 15 carbon atoms, such as phenylenediamine, naphthylenediamine, fluorenediamine, diphenyldiamine, anthracenediamine, and preferably 2,4- and 2,6-toluenediamine and 4,4'-, 2,4'-, and 2,2'-diaminodiphenylmethane, and aromatic polyamines such as 2,4,6-triaminotoluene, mixtures of polyphenyl-polymethylene-polyamines, and mixtures of diaminidiphenylmethanes and polyphenyl-polymethylene-polyamines. Preferred are ethylenediamine, propylenediamine, decanediamine, 4,4'-diaminophenylmethane, 4,4'-diaminocyclohexylmethane, and toluenediamine.

Suitable initiator molecules also include alkanolamines such as ethanolamine, diethanolamine, N-methyl- and N-ethylethanolamine, N-methyl- and N-ethyldiethanolamine and triethanolamine plus ammonia.

Suitable polyhydric polythioethers which may be condensed with alkylene oxides include the condensation product of thiodiglycol or the reaction product of a dicarboxylic acid such as is disclosed above for the preparation of the polyester polyols with any other suitable thioether glycol.

The polyester polyol may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the polyester polyol with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,2-propanedithiol, and 1,6-hexanedithiol; alkene thiols such as 2-butene-1,4-dithiol; and alkyne thiols such as 3-hexyne-1,6-dithiol.

Also suitable for mixture with the compound having polyester linkages are polymer modified polyols, in particular, the so-called graft polyols. Graft polyols are well known to the art and are prepared by the in situ polymerization of one or more vinyl monomers, preferably acrylonitrile and styrene, in the presence of a polyether or polyester polyol, particularly polyols containing a minor amount of natural or induced unsaturation. Methods of preparing such graft polyols may be found in columns 1–5 and in the Examples of U.S. Pat. No. 3,652,639; in columns 1–6 and the Examples of U.S. Pat. No. 3,823,201; particularly in columns 2–8 and the Examples of U.S. Pat. No. 4,690,956; and in U.S. Pat. No. 4,524,157; all of which patents are herein incorporated by reference.

Non-graft polymer modified polyols can also be mixed, for example, those prepared by the reaction of a polyisocyanate with an alkanolamine in the presence of a polyol as taught by U.S. Pat. Nos. 4,293,470; 4,296,213; and 4,374,209; dispersions of polyisocyanurates containing pendant urea groups as taught by U.S. Pat. No. 4,386,167; and polyisocyanurate dispersions also containing biuret linkages as taught by U.S. Pat. No. 4,359,541. Other polymer modified polyols may be prepared by the in situ size reduction of polymers until the particle size is less than 20 μm, preferably less than 10 μm.

The aliphatic or cycloaliphatic $C_4$-$C_7$ hydrocarbon has a boiling point of 50° C. or less at 1 atmosphere, preferably 38° C. or less. The hydrocarbon is physically active and has a sufficiently low boiling point to be gaseous at the exothermic temperatures caused by the reaction between the isocyanate and polyols, so as to foam the resulting polyurethane matrix. The hydrocarbon blowing agents consist exclusively of carbon and oxygen, therefore, they are non-halogenated by definition. Examples of the $C_4$-$C_7$ hydrocarbon blowing agents include linear or branched alkanes, e.g. butane, isobutane, 2,3 dimethylbutane, n- and isopentane and technical-grade pentane mixtures, n- and isohexanes, and n- and isoheptanes. Since very good results are achieved with respect to the stability of emulsions, the processing properties of the reaction mixture, and the lowering of the overall density in faced laminate board when n-pentane, isopentane or n-hexane, or a mixture thereof is used, these alkanes are preferably employed, most preferably n-pentane and isopentane. Specific examples of alkenes are 1-pentene, 2-methylbutene, 3-methylbutene, and 1-hexene, and of cycloalkanes are cyclobutane, preferably cyclopentane, cyclohexane or mixtures thereof. Preferentially, cyclopentane, n- and isopentane, and mixtures thereof are employed.

Other blowing agents which can be used in combination with the one or more $C_4$-$C_7$ hydrocarbon blowing agents may be divided into the chemically active blowing agents which chemically react with the isocyanate or with other formulation ingredients to release a gas for foaming, and the physically active blowing agents which are gaseous at the exotherm foaming temperatures or less without the necessity for chemically reacting with the foam ingredients to provide a blowing gas. Included with the meaning of physically active blowing agents are those gases which are thermally unstable and decompose at elevated temperatures.

Examples of chemically active blowing agents are preferentially those which react with the isocyanate to liberate gas, such as $CO_2$. Suitable chemically active blowing agents include, but are not limited to, water, mono- and polycarboxylic acids having a molecular weight of from 46 to 300, salts of these acids, and tertiary alcohols.

Water is preferentially used as a co-blowing agent with the hydrocarbon blowing agent. Water reacts with the organic isocyanate to liberate $CO_2$ gas which is the actual blowing agent. However, since water consumes isocyanate groups, an equivalent molar excess of isocyanate must be used to make up for the consumed isocyanates.

The organic carboxylic acids used are advantageously aliphatic mon- and polycarboxylic acids, e.g. dicarboxylic acids. However, other organic mono- and polycarboxylic acids are also suitable. The organic carboxylic acids may, if desired, also contain substituents which are inert under the reaction conditions of the polyisocyanate polyaddition or are reactive with isocyanate, and/or may contain olefinically unsaturated groups. Specific examples of chemically inert substituents are halogen atoms, such as fluorine and/or chlorine, and alkyl, e.g. methyl or ethyl. The substituted organic carboxylic acids expediently contain at least one further group which is reactive toward isocyanates, e.g. a mercapto group, a primary and/or secondary amino group, or preferably a primary and/or secondary hydroxyl group.

Suitable carboxylic acids are thus substituted or unsubstituted monocarboxylic acids, e.g. formic acid, acetic acid, propionic acid, 2-chloropropionic acid, 3-chloropropionic acid, 2,2-dichlorpropionic acid, hexanoic acid, 2-ethyl-hexanoic acid, cyclohexanecarboxylic acid, dodecanoic acid, palmitic acid, stearic acid, oleic acid, 3-mercapto-propionic acid, glycoli acid, 3-hydroxypropionic acid, lactic acid, ricinoleic acid, 2-aminopropionic acid, benzoic acid, 4-methylbenzoic acid, salicylic acid and anthranilic acid, and unsubstituted or substituted polycarboxylic acids, preferably dicarboxylic acids, e.g. oxalic acid, malonic acid, succinic acid, fumaric acid, maleic acid, glutaric acid, adipic acid, sebacic acid, dodecanedioic acid, tartaric acid, phthalic acid, isophthalic acid and citric acid. Preferable acids are formic acid, propionic acid, acetic acid, and 2-ethylhexanoic acid, particularly formic acid.

The amine salts are usually formed using tertiary amines, e.g. triethylamine, dimethylbenzylamine, diethylbenzylamine, triethylenediamine, or hydrazine. Tertiary amine salts of formic acid may be employed as chemically active blowing agents which will react with the organic isocyanate. The salts may be added as such or formed in situ by reaction between any tertiary amine (catalyst or polyol) and formic acid contained in the polyol composition.

Combinations of any of the aforementioned chemically active blowing agents may be employed, such as formic acid, salts of formic acid, and/or water.

Physically active blowing agents are those which boil at the exotherm foaming temperature or less, preferably at 50° C. or less at 1 atmosphere. The most preferred physically active blowing agents are those which have an ozone depletion potential of 0.05 or less. Examples of other physically active blowing agents are dialkyl ethers, cycloalkylene ethers and ketones; hydrochlorofluorocarbons (HCFCs); hydrofluorocarbons (HFCs); perfluorinated hydrocarbons (HFCs); fluorinated ethers (HFCs); and decomposition products.

Any hydrochlorofluorocarbon blowing agent may be used in the present invention. Preferred hydrochlorofluorocarbon blowing agents include 1-chloro-1,2-difluoroethane; 1-chloro- 2,2-difluoroethane (142a); 1-chloro-1,1-difluoroethane (142b); 1,1-dichloro-1-fluoroethane fluoroethane (141b); 1-chloro-1,1,2-trifluoroethane; 1-chloro-1,2,2-trifluoroethane; 1,1-dichloro- 1,2-difluoroethane; 1-chloro-1,1,2,2-tetrafluoroethane (124a); 1-chloro-1,2,2,2-tetrafluoroethane (124);1,1-dichloro-1,2,2-trifluoroethane;1,1-dichloro-2,2,2-trifluoroethane (123); and 1,2-dichloro-1,1,2-trifluoroethane (123a); monochlorodifluoromethane (HCFC- 22); 1-chloro-2,2,2-trifluoroethane (HCFC-133a); gem-chlorofluoroethylene (R-1131a); chloroheptafluoropropane (HCFC-217); chlorodifluoroethylene (HCFC-1122); and transchlorofluoroethylene (HCFC-1131). The most preferred hydrochlorofluorocarbon blowing agent is 1,1-dichloro-1-fluoroethane (HCFC-141b).

Suitable hydrofluorocarbons, perfluorinated hydrocarbons, and fluorinated ethers include difluoromethane (HFC-32); 1,1,1,2-tetrafluoroethane (HFC-134a); 1,1,2,2-tetrafluoroethane (HFC-134);1,1-difluoroethane (HFC-152a);1,2-difluoroethane (HFC-142), trifluoromethane; heptafluoropropane;1,1,1-trifluoroethane;1,1,2-trifluoroethane;1,1,1,2,2-pentafluoropropane; 1,1,1,3-tetrafluoropropane; 1,1,2,3,3-pentafluoropropane; 1,1,1,3,3-pentafluoro-n-butane; hexafluorocyclopropane (C-216); octafluorocyclobutane (C-318); perfluorotetrahydrofuran; perfluoroalkyl tetrahydrofurans; perfluorofuran; perfluoropropane, -butane,-cyclobutane,-pentane,-cyclopentane, and -hexane, -cyclohexane, -heptane, and -octane; perfluorodiethyl ether; perfluorodipropyl ether; and perfluoroethyl propyl ether.

Decomposition type physically active blowing agents which release a gas through thermal decomposition include pecan flour, amine/carbon dioxide complexes, and alkyl alkanoate compounds, especially methyl and ethyl formates.

The total and relative amounts of blowing agents will depend upon the desired foam density, the type of hydrocarbon, and the amount and type of additional blowing agents employed. Polyurethane foam densities typical for rigid polyurethane insulation applications range from free rise densities of 1.3 to 2.5 pcf, preferably from 1.3 to 2.1 pcf, and overall molded densities of 1.5 to 3.0 pcf. The amount by weight of all blowing agents is generally 10 php to 35 php, preferably 22 php to 28 php (php means parts per hundred parts of all polyols). Based on the weight of all the foaming ingredients, the total amount of blowing agent is generally from 4 wt % to 15 wt %. The amount of hydrocarbon blowing agent, based on the weight of all the foaming ingredients, is also from 4 wt. % to 15 wt %, preferably from 6 wt % to 8 wt %

Water is typically found in minor quantities in the polyols as a byproduct and may be sufficient to provide the desired blowing from a chemically active substance. Preferably, however, water is additionally introduced into the polyol composition in amounts from 0.05 to 5 pbw, preferably from 0.25 to 1.0 php. The physically active blowing agents, if employed, make up the remainder of the blowing agent for a total of from 10 php to 35 php, or 4 wt % to 15 wt. % based on the weight of all the foaming ingredients.

The third c) compound is a polyoxyalkylene polyether monool initiated with a $C_8$-$C_{24}$ fatty hydrocarbon having one alkylene oxide active hydrogen atom. The monool has a dual function, that of emulsifying the hydrocarbon in the polyol, the emulsion being stable for a period of at least 30 minutes, and lowering the density of the resulting foam. By a stable emulsion is meant that, for a period of at least 30 minutes, preferably for 2 hours, more preferably for 3 hours, the discrete hydrocarbon phase does not settle out or rise to the top of the continuous polyol phase in the absence of agitation or mixing. The hydrocarbon should remain uniformly dispersed throughout the continuous polyol phase.

In one embodiment, one may mix the hydrocarbon blowing agent in a polyol pre-mix tank and have a stable emulsion without the need for constant agitation. Further, a separate hydrocarbon blowing agent feed line to the mix head is no longer necessary. However, the scope of the invention includes a polyol composition of at least a polyol having polyester linkages, a $C_4$-$C_7$ hydrocarbon blowing agent, and the monool. This composition may be formed, however momentarily, in the mix head by separately metering each ingredients through its own feed line into the mix head. If one desires to form an emulsion, the composition may be formed by first premixing the monool with the polyol and the blowing agent in a polyol pre-mix tank to form an emulsion, after which the emulsion is mixed with the isocyanate in the mix head. Alternatively, the monool and the polyol may be mixed together and fed through a line to the mix head where the isocyanate and the blowing agent are separately metered through their own individual lines.

Whatever method of adding the monool is used, the foam resulting from the polyol composition of the invention has a lowered density. The foam made with the polyol composition of the invention has a density which is at least 2.00% less than the density of a reference foam made at the same isocyanate index and with all the same ingredients in the same amounts except without said monool and adding an amount of a) polyol corresponding to the amount of omitted monool, where the densities are measured from the core of free rise samples. Depending upon the amount of blowing agent used, the reduction in free rise foam density can be more pronounced, such as 3.00 or 4.00% at 8–9 wt. % of blowing agent based on the weight of all the foaming ingredients.

While one would normally expect to see a corresponding reduction in the mechanical properties of a foam with reduced density, the foams made with the polyol composition retain mechanical properties equivalent to the foams made at higher densities, such as compressive strengths and insulation values. In one embodiment of the invention, both GRF (glass reinforced facer) and aluminum faced foams made with the polyol composition have initial k-factors of 0.160 btu-in/hr-ft$^2$-degrees F. or less, and 0.165 btu-in/hr-ft$^2$-degrees F. or less at 100 days, when tested according to ASTM C518.

In another embodiment, the foams made with the polyol composition of the invention not only have reduced densities and insulation values as stated above, but also are dimensionally stable. The foam has a volume change, when aged from 1–28 days at 158 degrees F. and 100% r.h. of 3.0% or less, preferably of 2.0% or less; when aged from 1–28 days at 200 degrees F. of 3.0% or less, preferably of 2.5% or less; and when aged from 1–7 days at –20 degrees F. of less than 2.0%, preferably of 1.5% or less, with none of the stated values exceeded at any point throughout the 28 days.

The polyoxyalkylene polyether monools used in the invention may be prepared by the simple addition of one or more alkylene oxides to an initiator fatty hydrocarbon having one alkylene oxide active hydrogen represented by the general formula:

$$R-X$$

where R represents a $C_8$-$C_{24}$ branched or unbranched, saturated or ethylenically unsaturated, aliphatic or alicyclic radical; preferably an aliphatic linear, saturated or ethylenically unsaturated radical; more preferably a linear alkyl (saturated) radical, and most preferably a linear $C_{12}$-$C_{15}$ alkyl radical; and X represents OH, NRH, or SH, preferably OH.

In a preferred embodiment, the monool is initiated with a fatty alcohol, generically meaning that the R group is as stated above in its broadest sense, and the X group is OH. The fatty alcohol is preferably a branched or unbranched $C_8$-$C_{24}$ aliphatic primary or secondary alcohol, most preferably a branched or unbranched $C_{12}$-$C_{15}$ alkyl primary alcohol. As used herein, the designation of a fatty alcohol or a $C_{12}$-$C_{15}$ fatty alcohol, or any such similar designation includes those instances where the initiator may be composed purely of molecules each having the same number of carbon atoms and the same structure, the same number of carbon atoms but structural isomers or stereoisomers of each other, or a mixture of linear compounds having different numbers of carbon atoms so long as at least 90 wt. % of the molecules in the mixture have carbon chain lengths within the range described above. Thus, an initiator comprised of $C_{12}$-$C_{15}$ fatty alcohols, if a mixture of differing carbon chain lengths is used, means that at least 90 wt. % of the alcohol molecules have 12 to 15 carbon atoms. There is no limitation on the molecular weight distribution within the described range of carbon atom numbers. Mixtures of fatty alcohols having different numbers of carbon atoms are preferred. Alternatively, one may also employ a monodisperse initiator within the described range of carbon atoms.

It is preferred to use primary fatty hydrocarbons which have a linear structure. While some degree of branching may be tolerated, the hydrophobic properties of the monool diminish as the degree of branching increases. If a branched fatty hydrocarbon is used, it is preferred that the branched group be an alkyl group of 3 or less carbon atoms in length, more preferred located two or three carbons away from the polyoxyalkylene chain. Likewise, the hydrophobicity of the fatty chain is most enhanced when the alcohol functionality is terminal on the chain, which is always the case with primary fatty alcohols.

Examples of the preferred fatty alcohols include octyl alcohol, nonyl alcohol, decyl alcohol, dodecyl alcohol, tetradecyl alcohol, cetyl alcohol, lauryl alcohol, palmityl alcohol, stearyl alcohol, hydrogenated tallow alcohol, and mixtures thereof.

The monool of the invention is prepared by adding one or more types of alkylene oxides onto the initiator molecule. Examples of alkylene oxides are 1,3-propylene oxide, 1,2- and 2,3-butylene oxide, amylene oxides, and preferably ethylene oxide and 1,2-propylene oxide and mixtures of these oxides. The monools may be prepared from other starting materials such as tetrahydrofuran and alkylene oxide-tetrahydrofuran mixtures; epihalohydrins such as epichlorohydrin; as well as aralkylene oxides such as styrene oxide.

The alkylene oxides added to the initiator may be pure or a mixture of two or more alkylene oxides, preferably a mixture. In a preferred embodiment, a mixture of ethylene oxide and 1,2 propylene oxide is added onto the initiator molecule. The oxide mixture may be added in several steps or in one continuous step. A mixture of alkylene oxides such as ethylene oxide and propylene oxide added in one continuous step to the initiator will produce a random distribution of oxyethylene and oxypropylene units along the polyoxyalkylene chain, known as a heteric polyoxyethylene-polyoxypropylene polyether monool. Alternatively, the alkylene oxides may be added in a step wise fashion to the initiator to produce block(s) of oxyethylene units and block(s) of oxypropylene units in any order desired and with as many blocks as desired. In this alternative, a preferable embodiment is to make a 2 block monool having an internal block of oxyethylene units and a terminal block of oxypropylene units. A further alternative is to add onto the initiator a block of one alkylene oxide and in a second step add a mixture of alkylene oxides onto the block to make a block-heteric polyether monool.

The amount of alkylene oxide added will vary depending on the type alkylene oxides added. In one preferred embodiment, the amount of alkylene oxides added is sufficient to make a monool having a number average molecular weight of 1000 or less, more preferably, 800 or less, not counting the weight of the initiator molecule. In general, the total number of moles of alkylene oxides added onto the initiator molecule is from 2–20 moles, more preferably from 6–15 moles. It is preferred that the alkylene oxides added are ethylene oxide and 1,2 propylene oxide. The molar ratio of ethylene oxide to 1,2 propylene oxide in this preferred embodiment is from 1:3 to 1:0.20, more preferably from 1:1.75 to 1:0.45. The average number of moles of ethylene oxide in this preferred embodiment ranges from 3 to 11, more preferably from 4.0 to 9.0, while the average number of moles of 1,2-propylene oxide ranges from 2.2 to 10.0, more preferably from 2.5 to 8.5. The method of addition may be continuous or step-wise in this embodiment.

The addition of alkylene oxides to make the monools are generally carried out in the presence of an alkaline catalyst. Examples include sodium hydroxide, potassium hydroxide, sodium ethylate, sodium methylate, potassium acetate, sodium acetate, and trimethylamine. The reaction is usually carried out at elevated temperatures and pressures. The catalyst may be neutralized with a carboxylic acid.

The amount of monool used in the polyol composition is an amount effective to emulsify the blowing agent in the polyols for a period of at least thirty minutes. If one chooses, however, to add the $C_4$-$C_7$ hydrocarbon blowing agent at the mix head rather than forming an emulsion, the amount of monool added to the polyol is any amount desired to produce a foam having a reduced density. Usual amounts of monool range from 6 php–12 php.

Examples of monools include, but are not limited to, the Plurafac® surfactants sold by BASF Corporation. Plurafac RA-40 monool is a $C_{13}$-$C_{15}$ fatty alcohol onto which is added about 7 moles of propylene oxide and about 4 moles of ethylene oxide. Plurafac D-25 monool is a $C_{13}$-$C_{15}$ fatty alcohol onto which is added about 5 moles of propylene oxide and about 10 moles of ethylene oxide. Plurafac RA-50 monool is a mixture of equal parts of Plurafac D-25 and Plurafac RA40. Other useful Plurafac monools are RA-20, RA-30, RA43, RA-50, B25-5, B-26, and C-17. Similar to Plurafac RA30 and RA40 are Polytergent S305LF and S405LF manufactured by Olin Chemical. Examples of ethoxylated fatty alcohols include those manufactured by Shell Chemical Company under the name of Dobanol® 25-7, Dobanol 23-6.5, and Dobanol 45-11 (containing about 7 moles of ethylene oxide onto a $C_{12}$-$C_{15}$ fatty alcohol, about 6.5 moles of ethylene oxide onto a $C_{12}$-$C_{13}$ fatty alcohol, and about 11 moles of ethylene oxide added onto a $C_{14}$-$C_{15}$ fatty alcohol, respectively). Examples of linear secondary fatty alcohols onto which are added alkylene oxides are those manufactured by Union Carbide Corp. under the name of Tergitol 15-S-7 and Tergitol 15-S-9 (containing about 7 moles of ethylene oxide added onto a mixture of $C_{11}$-$C_{15}$ secondary fatty alcohol and about 9 moles of ethylene oxide added onto the same secondary fatty alcohols, respectively).

Additional optional ingredients in the polyol composition may include isocyanate and/or isocyanurate promoting catalysts, surfactants, flame retardants, and fillers.

Catalysts may be employed which greatly accelerate the reaction of the compounds containing hydroxyl groups and with the modified or unmodified polyisocyanates. Examples of suitable compounds are cure catalysts which also function to shorten tack time, promote green strength, and prevent foam shrinkage. Suitable cure catalysts are organometallic catalysts, preferably organotin catalysts, although it is possible to employ metals such as lead, titanium, copper, mercury, cobalt, nickel, iron, vanadium, antimony, and manganese. Suitable organometallic catalysts, exemplified here by tin as the metal, are represented by the formula: $R_nSn_2$, wherein R is a $C_1$-$C_8$ alkyl or aryl group, $R^1$ is a $C_0$-$C_{18}$ methylene group optionally substituted or branched with a $C_1$-$C_4$ alkyl group, Y is hydrogen or an hydroxyl group, preferably hydrogen, X is methylene, an —S—, an —SR²COO—, —SOOC—, an —O₃S—, or an —OOC— group wherein R² is a $C_1$-$C_4$ alkyl, n is 0 or 2, provided that $R^1$ is $C_0$ only when X is a methylene group. Specific examples are tin (II) acetate, tin (II) octanoate, tin (II) ethylhexanoate and tin (II) laurate; and dialkyl (1–8C) tin (IV) salts of organic carboxylic acids having 1–32 carbon atoms, preferably 1–20 carbon atoms, e.g., diethyltin diacetate, dibutyltin diacetate, dibutyltin diacetate, dibutyltin dilaurate, dibutyltin maleate, dihexyltin diacetate, and dioctyltin diacetate. Other suitable organotin catalysts are organotin alkoxides and mono or polyalkyl (1–8C) tin (IV) salts of inorganic compounds such as butyltin trichloride, dimethyl- and diethyl- and dibutyl- and dioctyl- and diphenyltin oxide, dibutyltin dibutoxide, di(2-ethylhexyl) tin oxide, dibutyltin dichloride, and dioctyltin dioxide. Preferred, however, are tin catalysts with tin-sulfur bonds which are resistant to hydrolysis, such as dialkyl (1–20C) tin dimercaptides, including dimethyl-, dibutyl-, and dioctyl- tin dimercaptides.

Tertiary amines also promote urethane linkage formation, and include triethylamine, 3-methoxypropyldimethylamine, triethylenediamine, tributylamine, dimethylbenzylamine, N-methyl-, N-ethyl- and N-cyclohexylmorpholine, N,N,N', N'-tetramethylethylenediamine, N,N,N',N'-tetramethylbutanediamine or -hexanediamine, N,N,N'-trimethyl isopropyl propylenediamine, pentamethyldiethylenetriamine, tetramethyldiaminoethyl ether, bis(dimethylaminopropyl)urea, dimethylpiperazine, 1-methyl-4-dimethylaminoethylpiperazine, 1,2-dimethylimidazole, 1-azabicylooctane and preferably 1,4-diazabicylooctane, and alkanolamine compounds, such as triethanolamine, triisopropanolamine, N-methyl- and N-ethyldiethanolamine and dimethylethanolamine.

To prepare the polyisocyanurate (PIR) and the PUR-PIR foams of the invention, a polyisocyanurate catalyst is employed. Suitable polyisocyanurate catalysts are alkali salts, for example, sodium salts, preferably potassium salts and ammonium salts, of organic carboxylic acids, expediently having from 1 to 8 carbon atoms, preferably 1 or 2 carbon atoms, for example, the salts of formic acid, acetic acid, propionic acid, or octanoic acid, and tris(dialkylaminoethyl)-, tris(dimethylamninopropyl)-, tris(dimethylaminobutyl)- and the corresponding tris(diethylaminoalkyl)-s-hexahydrotriazines. However, (trimethyl-2-hydroxypropyl)ammonium formate, (trimethyl-2-hydroxypropyl)ammonium octanoate, potassium acetate, potassium formate and tris(dimethylamninopropyl)-s-hexahydrotriazine are polyisocyanurate catalysts which are generally used. The suitable polyisocyanurate catalyst is usually used in an amount of from 1 to 10 parts by weight, preferably from 1.5 to 8 parts by weight, based on 100 parts by weight of the total amount of polyols.

Examples of suitable flame retardants are tetrakis(2-chloroethyl) ethylene phosphonate, tris(1,3-dichloropropyl) phosphate, tris(beta-chloroethyl) phosphate, tricresyl phosphate, tris(2,3-dibromopropyl)phosphate, tris(beta-chloropropyl)phosphate,tricresyl phosphate, and tris(2,3-dibromopropyl) phosphate.

In addition to the above-mentioned halogen-substituted phosphates, it is also possible to use inorganic or organic flameproofing agents, such as red phosphorus, aluminum oxide hydrate, antimony trioxide, arsenic oxide, ammonium polyphosphate (Exolit®) and calcium sulfate, expandable graphite or cyanuric acid derivatives, e.g., melamine, or mixtures of two or more flameproofing agents, e.g., ammonium polyphosphates and melamine, and, if desired, corn starch, or ammonium polyphosphate, melamine, and expandable graphite and/or, if desired, aromatic polyesters, in order to flameproof the polyisocyanate polyaddition products. In general, from 2 to 50 parts by weight, preferably from 5 to 25 parts by weight, of said flameproofing agents may be used per 100 parts by weight of the polyols.

Optional fillers are conventional organic and inorganic fillers and reinforcing agents. Specific examples are inorganic fillers, such as silicate minerals, for example, phyllosilicates such as antigorite, serpentine, hornblendes, amphiboles, chrysotile, and talc; metal oxides, such as kaolin, aluminum oxides, titanium oxides and iron oxides; metal salts, such as chalk, baryte and inorganic pigments, such as cadmium sulfide, zinc sulfide and glass, inter alia; kaolin (china clay), aluminum silicate and coprecipitates of barium sulfate and aluminum silicate, and natural and synthetic fibrous minerals, such as wollastonite, metal, and glass fibers of various lengths. Examples of suitable organic fillers are carbon black melamine, colophony, cyclopentadienyl resins, cellulose fibers, polyamide fibers, polyacrylonitrile fibers, polyurethane fibers, and polyester fibers based on aromatic and/or aliphatic dicarboxylic acid esters, and in particular, carbon fibers.

The inorganic and organic fillers may be used individually or as mixtures and may be introduced into the polyol composition or isocyanate side in amounts of from 0.5 to 40 percent by weight, based on the weight of components (the polyols and the isocyanate); but the content of mats, nonwovens and wovens made from natural and synthetic fibers may reach values of up to 80 percent by weight.

The organic polyisocyanates include all essentially known aliphatic, cycloaliphatic, araliphatic and preferably aromatic multivalent isocyanates. Specific examples include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and preferably 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5-isocyanatomethylcyclohexane (isophorone diisocyanate), 2,4- and 2,6-hexahydrotoluene diisocyanate as well as the corresponding isomeric mixtures, 4,4'- 2,2'-, and 2,4'-dicyclohexylmethane diisocyanate as well as the corresponding isomeric mixtures and preferably aromatic diisocyanates and polyisocyanates such as 2,4- and 2,6-toluene diisocyanate and the corresponding isomeric mixtures 4,4'-, 2,4'-, and 2,2'-diphenylmethane diisocyanate and the corresponding isomeric mixtures, mixtures of 4,4'- and 2,4'-diphenylmethane diisocyanates and polyphenylenepolymethylene polyisocyanates (polymeric MDI), as well as mixtures of polymeric MDI and toluene diisocyanates. The organic di- and polyisocyanates can be used individually or in the form of mixtures.

Frequently, so-called modified multivalent isocyanates, i.e., products obtained by the partial chemical reaction of organic diisocyanates and/or polyisocyanates are used. Examples include diisocyanates and/or polyisocyanates containing ester groups, urea groups, biuret groups, allophanate groups, carbodiimide groups, isocyanurate groups, and/or urethane groups. Specific examples include organic, preferably aromatic, polyisocyanates containing urethane groups and having an NCO content of 33.6 to 15 weight percent, preferably 31 to 21 weight percent, based on the total weight, e.g., with low molecular weight diols, triols, dialkylene glycols, trialkylene glycols, or polyoxyalkylene glycols with a molecular weight of up to 1500; modified 4,4'-diphenylmethane diisocyanate or 2,4- and 2,6-toluene diisocyanate, where examples of di- and polyoxyalkylene glycols that may be used individually or as mixtures include diethylene glycol, dipropylene glycol, polyoxyethylene glycol, polyoxypropylene glycol, polyoxyethylene glycol, polyoxypropylene glycol, and polyoxypropylene polyoxyethylene glycols or-triols. Prepolymers containing NCO groups with an NCO content of 25 to 9 weight percent, preferably 21 to 14 weight percent, based on the total weight and produced from the polyester polyols and/or preferably polyether polyols described below; 4,4'-diphenylmethane diisocyanate, mixtures of 2,4'- and 4,4'-diphenylmethane diisocyanate, 2,4,- and/or 2,6-toluene diisocyanates or polymeric MDI are also suitable. Furthermore, liquid polyisocyanates containing carbodiimide groups having an NCO content of 33.6 to 15 weight percent, preferably 31 to 21 weight percent, based on the total weight, have also proven suitable, e.g., based on 4,4'- and 2,4'- and/or 2,2'-diphenylmethane diisocyanate and/or 2,4'- and/or 2,6-toluene diisocyanate. The modified polyisocyanates may optionally be mixed together or mixed with unmodified organic polyisocyanates such as 2,4'- and 4,4'-diphenylmethane diisocyanate, polymeric MDI, 2,4'- and/or 2,6-toluene diisocyanate.

Preferably, the isocyanate used to make the closed cell rigid foams of the invention contain polymeric MDI, with the average functionality of the isocyanate component used to react with the polyol composition being 2.2 or more, more preferably 2.5 or more, most preferably 2.7 or more.

The foams of the invention are closed celled, meaning that greater than 80% of the cells are closed as measured for uncorrected porosity. Preferably, greater than 85%, more preferably 90% or more of the cells are closed as measured for uncorrected porosity. The foams of the invention are also rigid, meaning that they have a compressive strength to tensile strength ratio of at least 1.0 and an elongation at yield of less than 10%.

Polyol A is a polyester polyol having an OH number of about 240, and a functionality between 2–2.2, commercially available from Stepan Company.

Pluronic® L-44 is a polyoxyethylene-polyoxypropylene adduct having oxyethylene termination and an OH number of about 51, commercially available from BASF Corporation.

Pluronic® L-64 is a polyoxyethylene-polyoxypropylene adduct having oxyethylene termination and an OH number of about 38.7, commercially available from BASF Corporation.

Pluronic® 25R4 is a polyoxyethylene-polyoxypropylene adduct having oxypropylene termination and an OH number of about 31.2, commercially available from BASF Corporation.

Plurafac® RA20 is a polyoxyethylene-polyoxypropylene block monool of $C_{12}$-$C_{15}$ fatty monohydroxyl alcohols, terminated with oxypropylene units, having an OH number of about 71, commercially available from BASF Corporation. About 8 moles of ethylene oxide and about 4 moles of propylene oxide were added onto the initiator.

Plurafac® RA30 is a polyoxyethylene-polyoxypropylene block monool of $C_{12}$-$C_{15}$ fatty monohydroxyl alcohols, terminated with oxypropylene units, having an OH number of about 90, commercially available from BASF Corporation. About 6 moles of ethylene oxide and about 3 moles of propylene oxide were added onto the initiator.

Plurafac® RA40 is a polyoxyethylene-polyoxypropylene heteric monool of $C_{12}$-$C_{15}$ fatty monohydroxyl alcohols, having an OH number of about 69, commercially available from BASF Corporation. About 5 moles of ethylene oxide and about 7 moles of propylene oxide were added onto the initiator.

DBE is a dibasic ester.

B-8462 is a surfactant, commercially available from Goldschmidt.

K Hexcem 977 is potassium octoate, a trimerization catalyst, commercially available from Mooney Chem.

Polycat 5 is an amine catalyst, commercially available from Air Products.

N-pentane is 99.6% pure pentane commercially available from Phillips Petro.

Cyclopentane is 70% commercial grade cyclopentane, the remainder being mixtures of other hydrocarbons such as pentane and its isomer(s), commercially available from Phillips Petro.

Iso A is a polymeric MDI having a free NCO content of 31, a viscosity of about 700 cps at 25° C., and having a functionality of greater than 2.7, commercially available from BASF Corporation.

EXAMPLE 1

The ingredients listed in Table 1, except for the isocyanate, were mixed together in a stainless steel 3 gallon pre-mix tank in the amounts stated. A pneumatic mixer equipped with a German mix blade was used to blend the ingredients at about 1200 rpm for about 30 minutes. The pre-mix tank was positioned on a load scale to measure the weight of the ingredients during the blending operation, and any hydrocarbon gas escaping was continually replenished during the blending to keep the parts by weight of the gas constant. I noticed that the blended polyol composition for samples 6 and 7 below formed a stable emulsion, meaning that no phase separation between the pentane blowing agent and the polyols was apparent after letting the polyol composition sit for at least 30 minutes. Even after letting the polyol composition sit still for 3 hours without agitation, I could detect no phase separation. Subsequently, the pre-mix tank was attached to a resin day tank on an Edge Sweet II impingement mix machine. The contents of the pre-mix tank were gravity fed to the resin day tank and kept under agitation. When a shot of material was required, the polyol composition in the day tank was pumped through an in-line mixer to the mix head, where it was impingement mixed with the Iso A fed from a separate line. The resin day tank and the iso tank were kept at about 23° C. The mix head pressure was about 2000 psi, and the throughput was about 100 g/s. The impingement mixed polyol composition and isocyanate were shot into 4"×10"×10" wooden boxes fitted with cake boxes of the same dimension. The resulting foam inside the cake boxes were allowed to cure, after which the foams were tested for their mechanical properties reported below in Table 2.

For the foams made with facers, separate batches were blended using the same ingredients and amounts reported in Table 1 below by the same procedure noted above. The foams were shot from the Edge Sweet II machine into 2"×12"×12" aluminum molds preheated to 130° F. and faced on each half with either aluminum or glass reinforced facer (GRF). The foams were allowed to rise, cure, and were then demolded after about 5 minutes. The aluminum facer was about 1 mil thick.

Cup densities reported in Table 2 are free rise foams shot from the Edge Sweet II machine into #10 lily cups. The core densities were measured from a core taken from the cake box foams.

TABLE 1

| Sample | 1 | 2 | 3 | 4 | 5 | 6 | 7 | 8 |
|---|---|---|---|---|---|---|---|---|
| Polyol A | 100.0 | 100.0 | 100.0 | 90.0 | 90.0 | 90.0 | 90.0 | 100.0 |
| Pluronic L-44 | 9.00 | 9.00 | 9.00 | — | — | — | — | — |
| Pluronic 25R4 | — | — | — | 10.00 | — | — | — | — |
| Pluronic L-64 | — | — | — | — | 10.00 | — | — | — |
| Plurafac RA-20 | — | — | — | — | — | 10.00 | — | — |
| Plurafac RA-40 | — | — | — | — | — | — | 10.00 | — |
| DBE | — | 1.00 | 3.00 | — | — | — | — | — |
| B-8462 | 3.00 | 3.00 | 3.00 | 4.00 | 4.00 | 4.00 | 4.00 | 3.00 |
| K Hexcem 977 | 5.00 | 5.00 | 5.00 | 5.00 | 5.00 | 5.00 | 5.00 | 5.00 |
| Polycat 5 | 0.20 | 0.20 | 0.20 | 0.20 | 0.20 | 0.20 | 0.20 | 0.20 |
| Water | 0.50 | 0.50 | 0.50 | 0.50 | 0.50 | 0.50 | 0.50 | 0.50 |
| n-Pentane | 27.00 | 27.00 | 27.00 | 27.00 | 27.00 | 20.00 | 20.00 | — |
| Cyclopentane | — | — | — | — | — | — | — | 27.00 |
| Resin Total | 144.70 | 145.70 | 147.70 | 136.70 | 136.70 | 129.70 | 129.70 | 135.70 |
| Iso A | 199.8 | 199.8 | 199.8 | 181.4 | 181.9 | 184.3 | 184.0 | 196.5 |
| Index | 300 | 300 | 300 | 300 | 300 | 300 | 300 | 300 |
| Overall Total | 344.50 | 345.50 | 347.50 | 318.10 | 318.60 | 314.00 | 313.70 | 332.20 |
| % B.A. based on overall total | 7.8 | 7.8 | 7.8 | 8.5 | 8.5 | 6.4 | 6.4 | 8.1 |

TABLE 2

| Sample | 1 | 2 | 3 | 4 | 5 | 6 | 7 | 8 |
|---|---|---|---|---|---|---|---|---|
| Cup Density (pcf) | 1.84 | 1.64 | 1.58 | 1.50 | 1.48 | 1.83 | 1.90 | 1.64 |
| Core Density (pcf) | 2.30 | 2.38 | 1.78 | 1.66 | 1.64 | 2.01 | 2.10 | 1.83 |
| k-factor[1] initial | 0.162 | 0.157 | 0.160 | 0.154 | 0.161 | 0.145 | 0.148 | 0.142 |
| k-factor 10 days | 0.172 | 0.184 | 0.174 | 0.170 | 0.173 | 0.153 | 0.153 | 0.161 |
| k-factor 30 days | 0.183 | 0.199 | 0.188 | 0.180 | 0.184 | 0.160 | 0.162 | 0.173 |
| k-factor 100 days | — | — | — | — | — | — | — | — |
| k-factor initial aluminum GRF | 0.165 | 0.158 | 0.152 | 0.168 | 0.160 | 0.155 | 0.147 | 0.157 |
| | 0.152 | 0.152 | 0.149 | 0.158 | 0.152 | 0.145 | 0.142 | 0.146 |
| k-factor 10 days aluminum GRF | 0.160 | 0.156 | 0.154 | 0.175 | 0.162 | 0.155 | 0.147 | 0.156 |
| | 0.152 | 0.163 | 0.160 | 0.161 | 0.157 | 0.151 | 0.147 | 0.147 |
| k-factor 30 days aluminum GRF | 0.162 | 0.170 | 0.159 | 0.177 | 0.166 | 0.160 | 0.154 | 0.172 |
| | 0.158 | 0.162 | 0.157 | 0.178 | 0.161 | 0.154 | 0.163 | 0.159 |
| k-factor 100 days aluminum GRF | 0.166 | 0.175 | 0.163 | 0.182 | 0.172 | 0.160 | 0.157 | 0.168 |
| | 0.161 | 0.166 | 0.175 | 0.177 | 0.168 | 0.159 | 0.155 | 0.148 |
| % closed cell uncorrected | 88.83 | 86.49 | 95.78 | 94.57 | 92.69 | 92.62 | 98.16 | 96.01 |
| % closed cell corrected | 96.06 | 95.01 | 99.95 | 99.97 | 99.83 | 99.95 | 99.97 | 99.96 |
| Parallel 10% comp. | 32.0 | 35.8 | 31.2 | 26.4 | 23.7 | 32.9 | 34.4 | 34.7 |
| Parallel comp. yield deflection % | 9.4 | N.D. | N.D. | N.D. | 6.1 | 5.6 | 6.7 | 7.8 |
| Perpend. 10% comp. | 9.2 | 8.8 | 18.1 | 21.6 | 7.9 | 18.0 | 15.2 | 12.4 |
| Perpend. comp. yield deflection % | N.D. | N.D. | N.D. | N.D. | N.D. | N.D. | N.D. | N.D. |
| Butler Chimn wt. retention % 158 F. @ 100% R.H. | 26.27 | 33.18 | 42.34 | 31.96 | 36.14 | 44.96 | 47.45 | 48.82 |
| | 29.47 | 37.24 | 43.50 | 30.88 | 33.16 | 41.22 | 40.59 | 47.64 |
| | 25.91 | | | | 30.30 | 42.69 | 43.98 | 39.50 |

TABLE 2-continued

| Sample | 1 | 2 | 3 | 4 | 5 | 6 | 7 | 8 |
|---|---|---|---|---|---|---|---|---|
| 1 day | 5.7 | -3.0 | 0.3 | 0.8 | 4.9 | -0.1 | 0.4 | 1.4 |
| 2 days | 7.2 | 1.4 | 0.9 | 3.0 | 5.4 | 0.3 | 1.0 | 1.3 |
| 7 days | 8.7 | 8.5 | 1.0 | 2.0 | 8.0 | 0.4 | 1.0 | 2.2 |
| 14 days | 10.0 | 8.3 | 0.9 | 1.9 | 9.8 | 0.9 | 1.7 | 3.1 |
| 28 days | 10.4 | 0.7 | 0.8 | 1.2 | 11.0 | 1.0 | 1.8 | 2.5 |
| 200 F. | | | | | | | | |
| 1 day | 21.1 | 5.4 | 3.7 | 6.9 | 1.0 | 0.4 | 0.5 | 1.3 |
| 2 days | 20.8 | 5.3 | 7.1 | 7.7 | 1.8 | 0.4 | 0.8 | 1.7 |
| 7 days | 14.8 | 2.1 | 8.1 | 7.5 | 6.5 | 1.6 | 1.3 | 2.6 |
| 14 days | 11.6 | 1.4 | 4.3 | 3.9 | 12.6 | 1.4 | 1.1 | 2.4 |
| 28 days | 9.8 | 24 | 3.2 | 2.7 | 10.3 | 2.1 | 1.4 | 4.0 |
| -20 F. | | | | | | | | |
| 1 day | -35.7 | -4.7 | 0.5 | 0.6 | -6.2 | 1.2 | 0.9 | -8.0 |
| 2 days | -34.2 | -5.8 | 0.1 | 0.3 | -7.0 | 0.6 | 0.6 | -10.8 |
| 7 days | -31.9 | -1.1 | 0.3 | 0.4 | -11.0 | 0.0 | 0.7 | -12.3 |

[1] All the reported k-factors are in btu-in/hr-ft$^2$-degrees F.

The k factors of the cake box foams were improved when the polyol composition contained the Plurafac® monools. Comparing samples 6 and 7 with samples 1–5 and 8, it is evident that the monools had a positive influence on the insulation factors of the rigid foams. The aluminum and GRF faced foams made with the monools (samples 6 and 7) also showed an improvement in k-factors over foams made with the dihydroxyl compounds of samples 1–5, although the difference was not as dramatic as noted with the unfaced rigid foam samples. The compressive strengths at 10% deflection and the percentage deflection at yield in samples 6 and 7 were as good as or better than the remaining samples made with dihydroxyl compounds or without an additive. The flammability properties of the foams made with the monools was better than foams made with the dihydroxyl compounds and as good as the cyclopentane blown foam made without an additive, as demonstrated by the higher Butler Chimney weight retentions. The flammability characteristics of the foam samples would be improved in all samples, however, if a flame retardant were added to the formulation.

EXAMPLE 2

In this example, the effect of the monools upon foam density was tested. Four categories of foams were tested: those made with the monool, with cyclopentane or n-pentane as blowing agents, and those made without the monool, blown with cyclopentane or n-pentane. Master batches A (without the monool) and B (with the monool) were first prepared in individual stainless steel pre-mix tanks according to the procedure described in Example 1. The blowing agents were added in the amounts stated in Table 3 below to make a polyol composition, which was subsequently attached to the Edge Sweet II machine for reaction with the Iso A in the mix head and foaming in the cake box, all according to the procedure of Example 1. The density of each foam sample was tested for overall density and a core sample measuring 3"×3"×3", taken from each corresponding foam. The results are reported in Table 3.

Master batch blend A was made of 1200 g of Polyol A, 48 g of B-8462, 48 g of Hexchem 977, 1.8 g of Polycat 5, 180 g of Fyrol PCF fire retardant, and 6.0 g of distilled water, for a total of 1483.8 grams. Master batch blend B was the same as blend A, except that 120 g of Plurafac® RA40 monool partially replaced Polyol A, leaving 1080 g of Polyol A. All other ingredients were in the same amount and type.

TABLE 3

| Sample | 1 | 2 | 3 | 4 | 5 | 6 |
|---|---|---|---|---|---|---|
| Blend A | 125.65 | — | 123.65 | — | 123.65 | — |
| Blend B | — | 123.65 | — | 123.65 | — | 123.65 |
| n-pentane | 20.50 | 19.64 | 24.20 | 23.20 | 27.90 | 26.80 |
| cyclopentane | — | — | — | — | — | — |
| total resin | 144.15 | 143.29 | 147.85 | 146.85 | 151.55 | 150.45 |
| Iso A | 197.0 | 184.0 | 197.0 | 184.0 | 197.0 | 184.0 |
| total overall Index | 300 | 300 | 300 | 300 | 300 | 300 |
| % Blowing Agent | 6 | 6 | 7 | 7 | 8 | 8 |
| Overall Density (pcf) | 2.03 | 1.96 | 1.87 | 1.79 | 1.72 | 1.62 |
| Core Density (pcf) | 1.91 | 1.84 | 1.69 | 1.65 | 1.55 | 1.47 |

| Sample | 7 | 8 | 9 | 10 | 11 | 12 |
|---|---|---|---|---|---|---|
| Blend A | 123.65 | — | 123.65 | — | 123.65 | — |
| Blend B | — | 123.65 | — | 123.65 | — | 123.65 |
| n-pentane | 31.80 | 30.43 | — | — | — | — |
| cyclopentane | — | — | 20.50 | 19.64 | 24.20 | 23.20 |
| total resin | 155.45 | 154.08 | 144.15 | 143.29 | 147.85 | 146.85 |
| Iso A | 197.0 | 184.0 | 197.0 | 184.0 | 197.0 | 184.0 |
| total overall Index | 300 | 300 | 300 | 300 | 300 | 300 |
| % Blowing Agent | 9 | 9 | 6 | 6 | 7 | 7 |
| Overall Density (pcf) | 1.58 | 1.56 | 2.37 | 2.41 | 2.04 | 2.04 |
| Core Density (pcf) | 1.42 | 1.37 | 2.10 | 2.11 | 1.81 | 1.77 |

| Sample | 13 | 14 | 15 | 16 |
|---|---|---|---|---|
| Blend A | 123.65 | — | 12.65 | — |
| Blend B | — | 123.65 | — | 123.65 |
| n-pentane | — | — | — | — |
| cyclopentane | 27.90 | 26.80 | 31.8 | 30.4 |
| total resin | 151.55 | 150.45 | 155.48 | 154.0 |

TABLE 3-continued

| | | | | |
|---|---|---|---|---|
| Iso A total overall | 197.0 | 184.0 | 197.0 | 184.0 |
| Index | 300 | 300 | 300 | 300 |
| % Blowing Agent | 8 | 8 | 9 | 9 |
| Overall Density (pcf) | 1.88 | 1.87 | 1.71 | 1.72 |
| Core Density (pcf) | 1.62 | 1.59 | 1.47 | 1.44 |

Foam samples 1–8 were blown with n-pentane, while foam samples 9–16 were blown with cyclopentane. The density of each foam at a given percentage of blowing agent was measured with and without the monool Plurafac® RA40. In samples 1–8, it is evident that the foams made with the batch B containing the monool were lower in density than the foams made without the monool using the same percentage and type of blowing agent, and using the same amount and type of ingredients in the batch except for the monool. Using cyclopentane as the blowing agent, the reduction in density was apparent in the core density at blowing agent levels above 6%. The reduction in the overall density, however, was not noticeable.

What we claim is:

1. A polyol composition comprising:
   a) a polyol having polyester linkages;
   b) an aliphatic or cycloaliphatic $C_4$-$C_7$ hydrocarbon;
   c) a polyoxyalkylene polyether monool initiated with a $C_8$-$C_{24}$ fatty hydrocarbon having one alkylene oxide active hydrogen atom.

2. The polyol composition of claim 1, wherein the monool is initiated with a fatty alcohol.

3. The polyol composition of claim 2, wherein the monool is initiated with a fatty hydrocarbon comprising a $C_{12}$-$C_{15}$ fatty alcohol.

4. The polyol composition of claim 3, wherein the number average molecular weight of the monool is 1000 or less, exclusive of the initiator.

5. The polyol composition of claim 4, wherein the number average molecular weight of the monool is 800 or less, exclusive of the initiator.

6. The polyol composition of claim 5, wherein the monool is a heteric polyoxyethylene-polyoxypropylene polyether monool.

7. The polyol composition of claim 5, wherein the monool comprises an internal block of polyoxyethylene units and a terminal block of polyoxypropylene units.

8. The polyol composition of claim 5, wherein the $C_4$-$C_7$ hydrocarbon comprises n-pentane, isopentane, or mixtures thereof.

9. The polyol composition of claim 5, wherein the a) compound comprises a polyol having a number average molecular weight of 400 or more.

10. The polyol composition of claim 9, wherein the a) compound comprises a polyester polyol having a number average molecular weight of 400 or more.

11. The polyol composition of claim 10, further comprising water.

12. The polyol composition of claim 1, wherein the fatty hydrocarbon initiator comprises a $C_8$-$C_{24}$ fatty alcohol, said initiator reacted with a total average of 2–20 moles of an alkylene oxide.

13. The polyol composition of claim 12, wherein said alkylene oxide comprises ethylene oxide, propylene oxide, or mixtures thereof.

14. The polyol composition of claim 13, wherein the monool has a number average molecular weight of 1000 or less.

15. The polyol composition of claim 14, wherein the fatty hydrocarbon initiator comprises $C_{12}$-$C_{15}$ fatty alcohols.

16. The polyol composition of claim 15, wherein ethylene oxide and propylene oxide are randomly added onto the $C_{12}$-$C_{15}$ fatty alcohols and onto each other.

17. The polyol composition of claim 12, wherein the total average number of moles of alkylene oxide is from 6 to 15.

18. The polyol composition of claim 15, wherein the $C_4$-$C_7$ hydrocarbon blowing agent comprises n-pentane, isopentane, cyclopentane, or mixtures thereof, and the a) compound comprises a polyester polyol having a number average molecular weight of 400 or more.

19. The polyol composition of claim 1, wherein the a) compound comprises a polyester polyol having a number average molecular weight of 400 or more, and the $C_4$-$C_7$ hydrocarbon blowing agent comprises n-pentane, isopentane, cyclopentane, or mixtures thereof.

20. The polyol composition of claim 19, comprising an emulsified polyol composition, wherein the amount of the monool is effective to emulsify the blowing agent in the polyester polyol.

21. The polyol composition of claim 1, comprising an emulsified polyol composition comprising:
   a) a polyester polyol having a number average molecular weight of 400 or more;
   b) 10 php to 35 php of a blowing agent comprising n-pentane, isopentane, cyclopentane, or mixtures thereof; and
   c) an amount of monool effective to emulsify the blowing agent in the polyester polyol for a period of at least 30 minutes.

22. The polyol composition of claim 21, wherein the amount of blowing agent comprises 22 php–28 php.

23. The polyol composition of claim 21, wherein the amount of monool ranges from 6 php–12 php.

24. The polyol composition of claim 21, wherein the polyester polyol comprises terephthalic acid, dimethyl terephthalate, polyethylene terephthalate, phthalic acid, isophthalic acid, phthalic anhydride, and/or by-products from the manufacture thereof, based polyester polyols.

25. The polyol composition of claim 1, wherein said emulsified polyol composition is reacted with an organic polyisocyanate compound.

26. The polyol composition of claim 25, further comprising an isocyanurate promoting catalyst.

* * * * *